United States Patent [19]

Cuel

[11] Patent Number: 4,659,579
[45] Date of Patent: Apr. 21, 1987

[54] DEHYDRATION PROCESS FOR MOIST VEGETABLES

[75] Inventor: Jacques Cuel, Paris, France

[73] Assignee: Beghin-Say S.A., Thumeries, France

[21] Appl. No.: 601,622

[22] PCT Filed: Jul. 19, 1983

[86] PCT No.: PCT/FR83/00147
§ 371 Date: Mar. 26, 1984
§ 102(e) Date: Mar. 26, 1984

[87] PCT Pub. No.: WO84/00475
PCT Pub. Date: Feb. 16, 1984

[30] Foreign Application Priority Data

Jul. 30, 1982 [FR] France .................. 82 13400

[51] Int. Cl.⁴ .............................................. A23B 7/02
[52] U.S. Cl. ........................................ 426/465; 34/86; 426/640
[58] Field of Search ............... 426/465, 615, 616, 640; 34/35, 86, 169

[56] References Cited

U.S. PATENT DOCUMENTS 2,774,671 12/1956 Cotton et al. ................. 426/616
3,551,163 12/1970 Vincent ......................... 426/616
4,058,634 11/1977 Kunz ............................. 426/465

Primary Examiner—George Yeung
Attorney, Agent, or Firm—A. W. Breiner

[57] ABSTRACT

Moist vegetables (2) undergo at least one pressing operation (3) and are introduced into a drier (9) of which the heater elements are fed with vapor recompressed by a compressor unit (20). The juice (4) from the last pressing operation acts as the cold fluid in an evaporator (5) of which the tube stack is fed by the mixture of air and vapor (10) issuing from the moist vegetables being dried. The vapor (6) produced by the evaporator (5) feeds the compressor unit (20). The concentrated juice (7) is used to re-steep the moist vegetables (2) before they enter the pressing zone (3).

8 Claims, 7 Drawing Figures

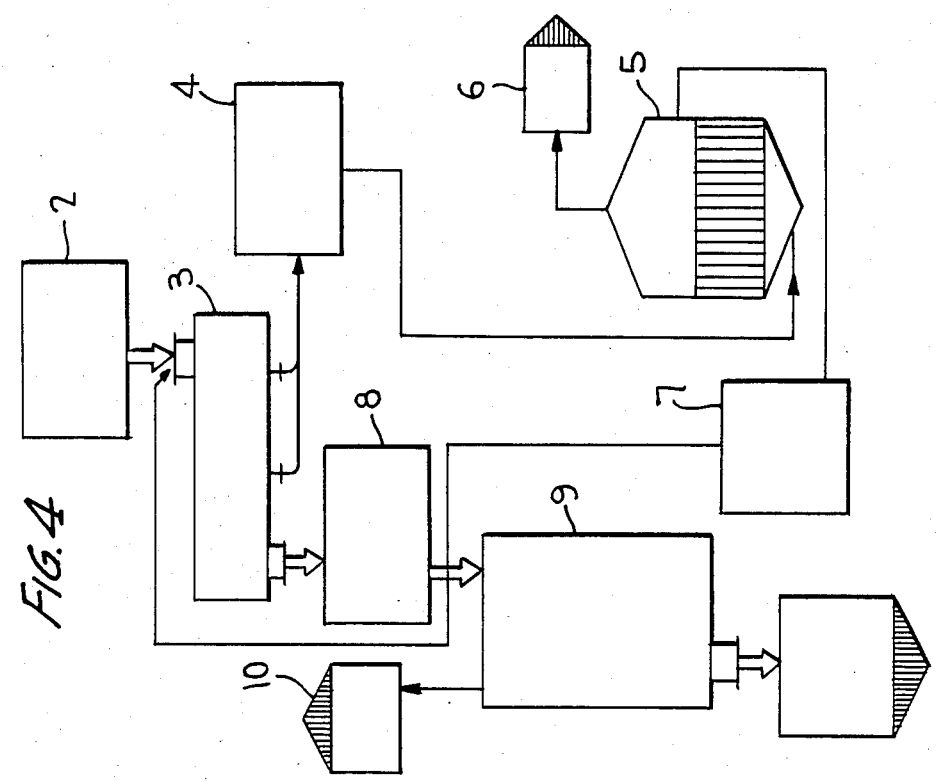
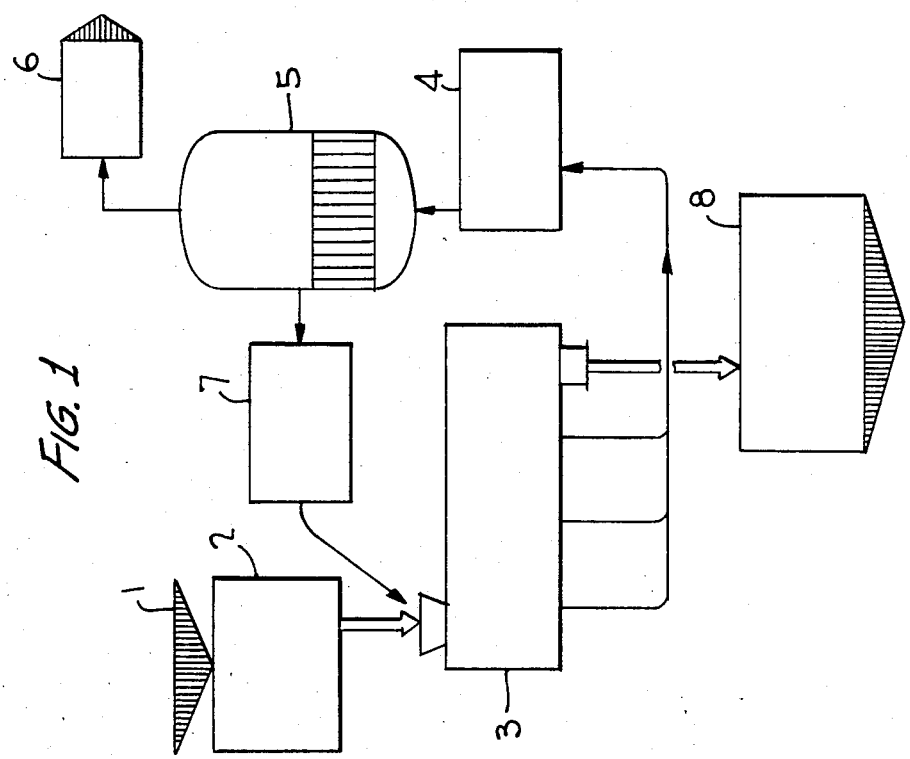

DEHYDRATION PROCESS FOR MOIST VEGETABLES

The present invention concerns a dehydration process for moist vegetables, in particular alfalfa or beet pulp.

Applicant in its French patent application No. 81 14670 filed on July 28, 1981 described a drying process which is particularly advantageous with respect to saving energy; moist vegetables are introduced in a vertical drier provided with staggered plates and heated by vapor which is recompressed by a compressor unit.

The recompressed vapor arrives in particular from an evaporator of which the tube stack is fed by the mixture of air and vapor issuing from the moist material, this mixture being made to saturate through an exchange with a cold fluid.

This saturated air-vapor mixture is injected at the bottom of the drier and takes part in drying the moist material; it acts as a vehicle for the calories, by passing from a saturated state into a state where it is capable of storing calories.

Moreover, it is known to dehydrate moist vegetables by adding a large amount of dry matter in the form of a highly concentrated solution, whereby the final proportion of dry matter of the mixture is correspondingly increased.

For instance, French Pat. No. 2,401,223 describes a beet-pulp fabrication process where the beets are treated with molasses, which consists in incorporating a large amount of molasses in the form of a solution with dry-matter content exceeding 80% (80 Brix) into the pressed pulp, and then in pressing the mixture so obtained.

U.S. Pat. No. 3,551,163 describes a recovery process for citrus pulp obtained after pressing the fruit in order to be used as feed. This process includes two consecutive pressing operations and, before the second one, re-steeping the moist matter with the juices from the first and second pressing operations. The juice is concentrated to more than 70 Brix prior to the re-steeping. In this case, too, a substantial addition of dry matter is involved.

The incorporation of a solution with a very high drymatter content does not allow adequately homogenizing the mixture, and hence the subsequent pressing operation is less efficient. This appears to be due to certain essential elements reinforcing the pectic chains, for instance calcium and aluminum being incapable of penetrating the cell spaces of the pulp when the solutions with additives are too concentrated.

A first object of the present invention is to permit improved vegetable dehydration during the pressing operation.

The invention consists in applying one or several consecutive pressing operations to these moist vegetables and is characterized by the juice from the last pressing operation and concentrated within an evaporator to a concentration exceeding 1% but less than 60% by weight of dry matter being used in steady-state operation to re-steep the moist vegetables prior to this last pressing operation. The concentration of the pressing juice is assured by the vapor or hot-gas production.

The process of the invention is particularly well suited to:

(1) Drying the pulp of beets which were subjected to a double pressing operation with concentration of the juice of the second pressing operation and recycling of this juice prior to the second pressing operation. Preferably the concentrated press juice is of a concentration less than 40% and advantageously less than 20%, and better yet between 4 and 15%.

(2) Drying alfalfa subjected to a single pressing operation with prior concentration of the press juice which is recycled. Preferably, the concentrated press juice is of a concentration less than 55% but higher than 20%.

After the last pressing operations, the moist vegetables can then be introduced into a vertical drier of which the heater elements are fed by vapor recompressed by a compressor unit. Preferably this compressor unit is fed with vapor from the evaporator of which the cold fluid is juice from the last pressing operation and of which the tube stack is fed with the mixture of air and vapor from the moist vegetables while they are being dried. This procedure is particularly economical and, furthermore, uses only electrical energy, not thermal energy as do the methods described in the above-analyzed patents.

It is also possible to preheat the juice before it enters the evaporator by passing it through an exchanger fed with water of condensation from the evaporator.

As regards alfalfa, the pressing juice is flocculated and centrifuged before being concentrated in the evaporator so as to obtain a serum and a flocculate mainly consisting of proteins. Under these conditions the compressor unit advantageously is fed with vapor generated by the evaporator of which the cold fluid consists of the serum separated from the press juice and of which the tube stack is fed by the airvapor mixture issuing from the moist alfalfa while it is being dried.

The invention will be better understood in relation to the illustrative embodiments and the attached drawings:

FIG. 1 is the block diagram of a double pressing plant for beet pulp, wherein the juice from the second pressing operation is concentrated.

FIG. 4 is the alfalfa dehydration schematic with a pressing and concentrating operation for the press juice.

EXAMPLE 1

Figure 2:
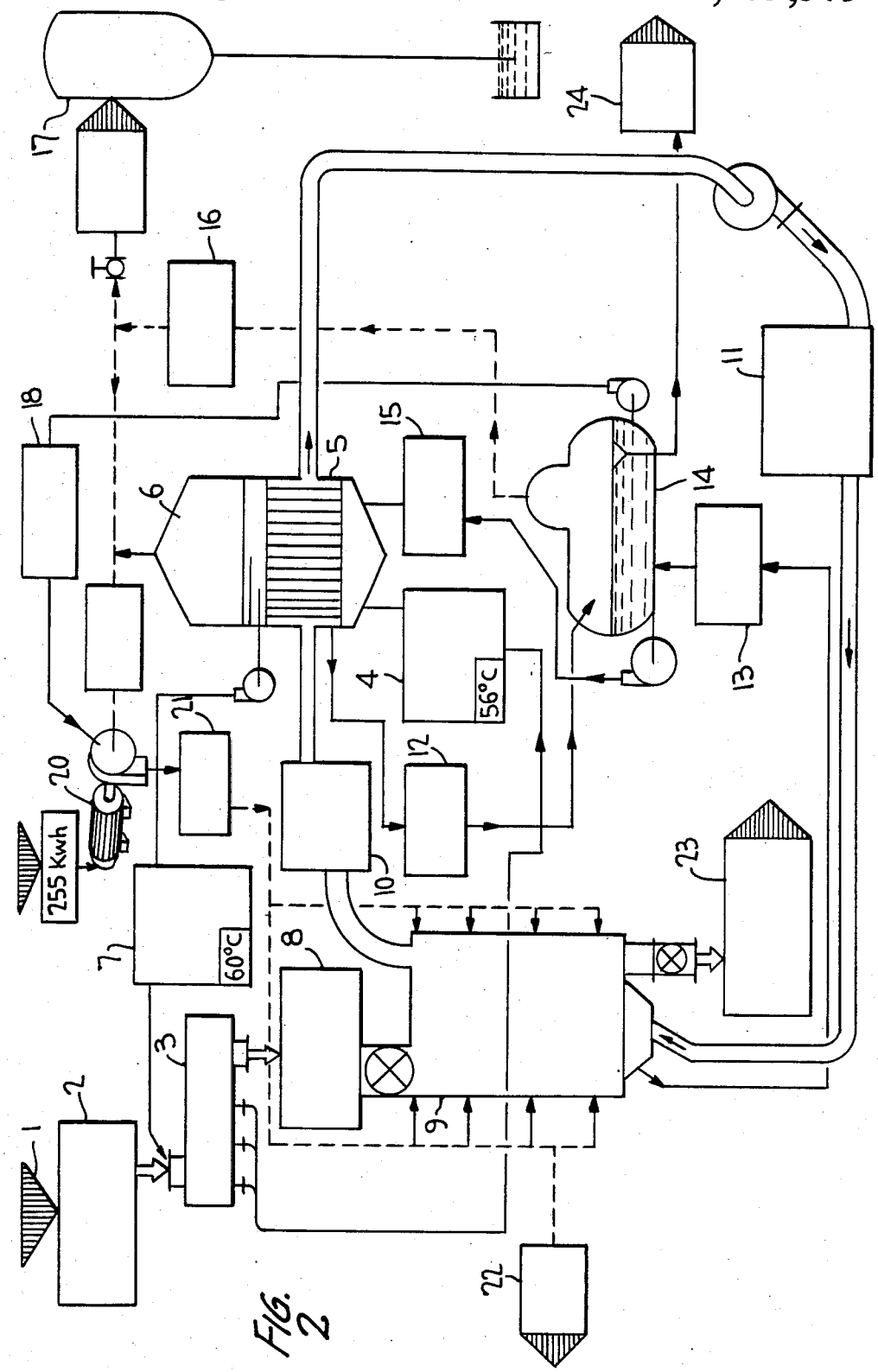
FIG. 2 is the block diagram for dehydrating beet pulp with double pressing and concentrating the second press juice a content of 6% dry matter.

FIG. 1: Pulp of beets (2) from a pressing plant (1) and containing 900 kg of dry matter and 3000 kg of water, when in steady-state, is at a temperature of 60° C. Following a second pressing operation (3), the amounts below are recovered:

a juice (4) consisting of 70.4 kg of dry matter and 2276 kg of water, pulp (8) which is partly dehydrated and containing 900 kg of dry matter and 1827 kg of water.

The juice (4) is moved toward an evaporator (5) generating 1173 kg of vapor at 60° C. The concentrated juice (7) containing 70.4 kg of dry matter and 1103 kg of water is recycled at the input of the second pressing stage (3).

EXAMPLE 2

FIG. 2: Pulp (8) partly dehydrated as in Example 1 is introduced in steady-state into a vertical drier (9).

The juice (4) from the second pressing operation and at a temperature of =° C. is moved toward an evaporator (5) of which it represents the cold fluid.

The tube stack of evaporator (5) is fed with a mixture (10) of air and vapor at 95° C. containing 2208 kg of air and 2340 kg of vapor.

A mixture (11) of air and vapor at 70° C. and containing 2208 kg of air and 613 kg of vapor is obtained at the output of the evaporator tube stack and is reinjected at the bottom of the drier (9).

The 1842 kg of the 75° C. return waters (13) from the drier and the 1727 kg of 75° C. condensation waters (12) of the mixture (10) of air and vapor are moved toward a self-evaporation still (14).

563 kg of water (15) at 60° C. from the still (14) and in wholly evaporated form are moved into the evaporator. 1736 kg of vapor (6) at 60° C. are recovered at the output of the evaporator (5).

The still (14) provides 78 kg of vapor (16) at 60° C. of which 68 kg are moved toward a condenser (17) and 10 kg toward the compressor unit (20).

In this manner the compressor unit (20) receives 1746 kg of vapor (19) at 60° C. and 262 kg of de-superheated water (18) from the still (14). The compressor unit (20) provides 2008 kg of vapor (21) at 110° C.

The system losses (22) are 166 kg of vapor. The still (14) provides 2666 kg of water (24) at 60° C.

1000 kg of beet pulp (23) containing 900 kg of dry matter and 100 kg of water are collected at the drier output.

In this manner 2900 kg of water from the moist pulp issuing from the first pressing stage (1) were eliminated.

The power required to recompress the 1746 kg of vapor (16) is 255 kwh. Accordingly, the energy loss is only 0.088 kwh per kg of eliminated water. To arrive at the overall energy cost, the energy required to carry out the second pressing operation (2) and which is 0.010 kwh per kg of eliminated water must be taken into account.

The bottom line, therefore, is a cost of 0.098 kwh per kg of eliminated water, corresponding to 245 kcal per kg of eliminated water on the basis of 2.5 thermal units per kwh (condensation station).

This figure must be compared with the expenditure of 600–750 kcal per kg of eliminated water that is incurred in a conventional drier.

EXAMPLE 3

Figure 3:
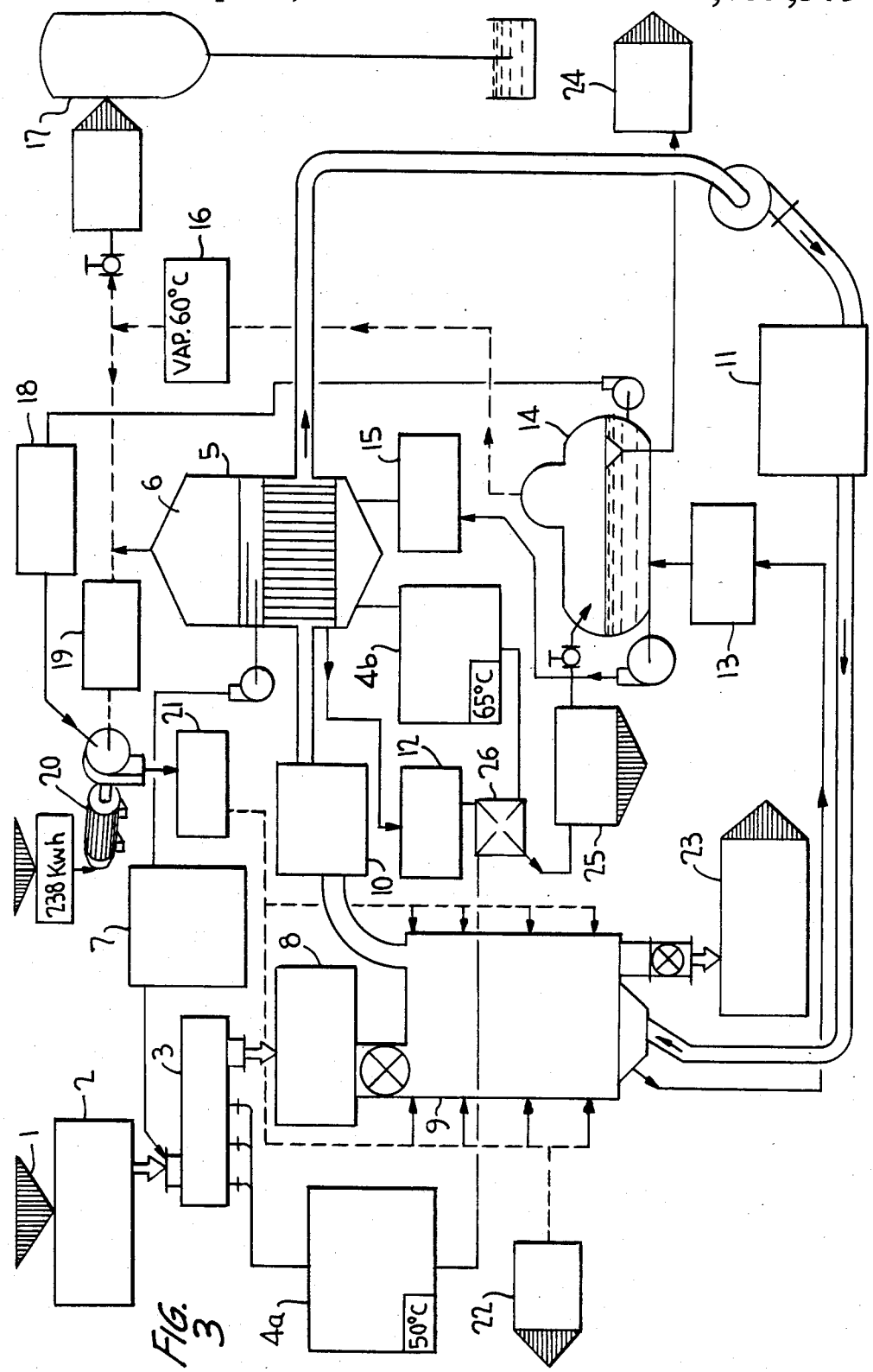
FIG. 3 is a block diagram for drying beet pulp using a drier fed with recompressed vapor, the pulp having been subjected to a second pressing operation resulting in a juice with 7.5% dry matter.

FIG. 3: Partly dehydrated pulp (8) is introduced in steady-state into the vertical drier (9). In a variation from Example 2, more water was eliminated from the moist pulp and in lieu of recovering a juice containing 70.4 kg of dry matter and 2276 kg of water, this time a juice (4a) containing 74 kg of dry matter and 2204 kg of water is obtained.

The juice (4a) is preheated in an exchanger (26) fed by 1609 kg of water at 75° C. from the waters of condensation (12) of the evaporator (5).

1609 kg of water at 54.25° C. is eliminated at (25).

The preheated juice (4b) is at a temperature of 65° C.; it is introduced as the cold fluid in the evaporator (5). At the output of the evaporator (5), the concentrated juice (7) contains 74 kg of dry matter and 913 kg of water.

The tube stack of the evaporator (5) is fed with a mixture (10) of air and vapor at 95° C. containing 2057 kg of air and 2181 kg of water. A mixture of air and vapor (11) at 70° C. is obtained at the output of the evaporator tube stack, containing 2057 kg of air and 572 kg of vapor, and is reinjected at the bottom of the drier (9).

The 1718 kg of return waters (13) from the drier (9) at a temperature of 75° C. are moved into the self-evaporation still (14).

369 kg of water (15) at 60° C. from the still (14) and totally evaporated are moved toward the evaporator (5). At the output of the evaporator (5), 1660 kg of vapor at 60° C. are recovered, of which 31 kg are moved toward the condenser (17).

The condenser (17) receives 76 kg of vapor at 60° C., part of which is from the vapor (6) produced by the evaporator (5) and part of which is from the still (14) providing 45 kg of vapor at 60° C. and moved as a whole toward the condenser (17).

The compressor unit (20) receives 1629 kg of vapor (19) at 60° C. and 244 kg of de-superheated water (18) from the still (14). The compressor unit (20) delivers 1873 kg of vapor (21) at 110° C.

The system losses (22) are 155 kg of vapor. The still (14) delivers 1060 kg of water (24) at 60° C.

1000 kg of beet pulp (23) containing 900 kg of dry matter and 100 kg of water are recovered at the drier output.

In this manner 2900 kg of water was removed from the moist pulp (2) issuing from the first pressing stage (1).

The power required to recompress the 1629 kg of vapor is 238 kwh. Therefore, the expenditure in energy is only 0.082 kwh per kg of eliminated water. As in Example 2, the bottom line takes into account the energy required by the second pressing operation, and turns out to be 0.092 kwh per kg of eliminated water, i.e., 230 kcal per kg of eliminated water (with a coefficient of 2.5).

EXAMPLE 4

FIG. 4: Moist alfalfa (2) containing 2000 kg of dry matter and 8000 kg of water is moved in the steady-state toward a press (3).

The press juice (4) containing 350 kg of dry matter and 4220 kg of water is moved into an evaporator (5) which produces 3850 kg of vapor (6) and returns a concentrated juice (7) containing 350 kg of dry matter and 350 kg of water. The concentrated juice (7) is reinjected into the press (3). After pressing, the pressed alfalfa (8) containing 2000 kg of dry matter and 4150 of water is introduced into a drier (9).

3925 kg of vapor (10) and dried alfalfa (23) containing 2000 kg of dry matter and 225 kg of water are obtained.

EXAMPLE 5

Figure 5:
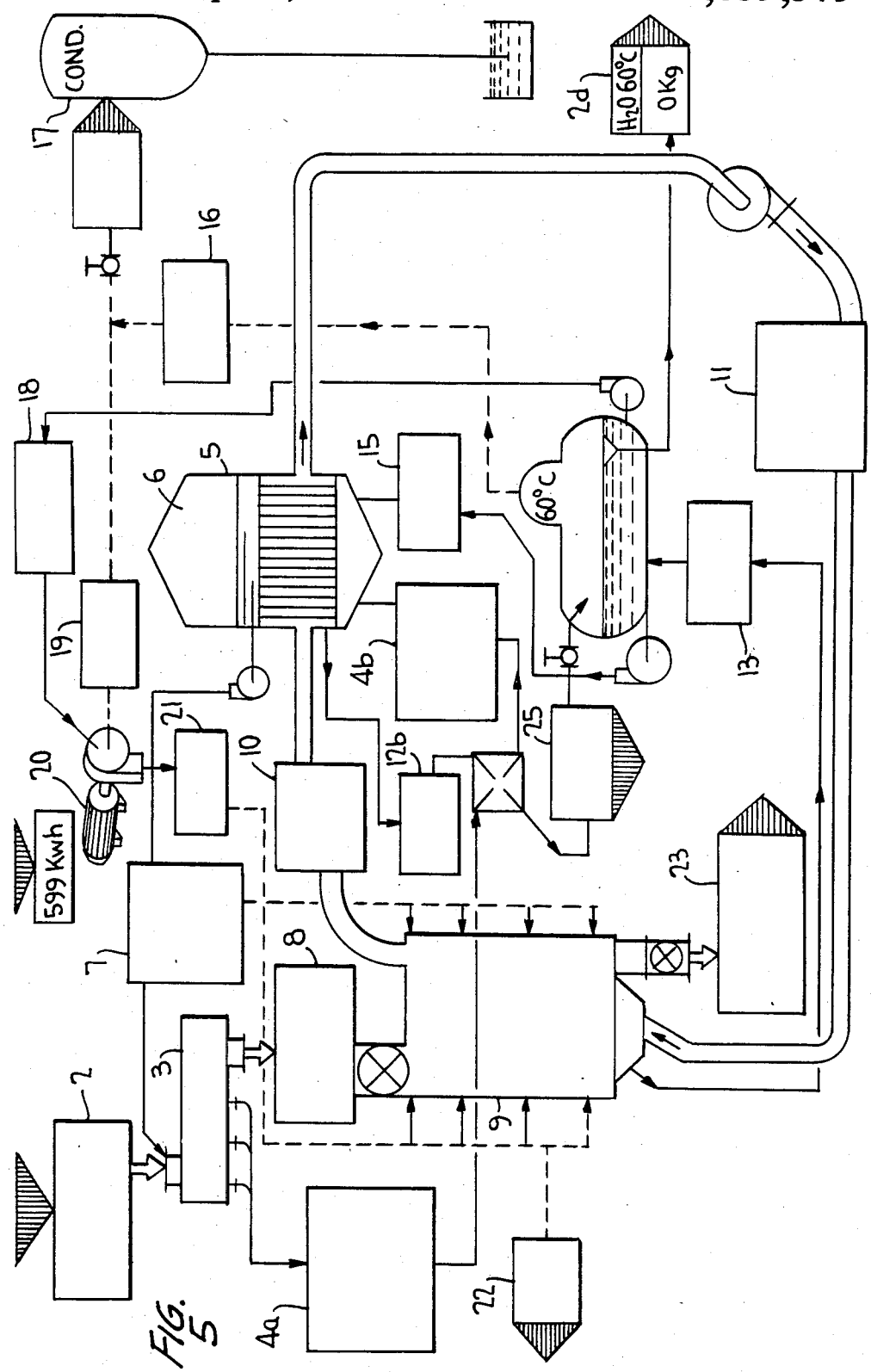
FIG. 5 is the alfalfa drying schematic for a drier fed with the recompressed vapor, the press juice being concentrated.

FIG. 5: Pressed alfalfa (8) is introduced in steady-state as in the previous example into the drier (9).

The press juice (4a) at a temperature of 25° C. then is preheated in an exchanger (26) to a temperature of 55° C.

The exchanger (26) is fed with 7346 kg of water (12b) at 60° C. from the still (14). The water cooled to 42.4° C. is discharged at (25).

The preheated juice (4b) is introduced as the cold fluid into the drier (5) of which the tube stack is fed with the mixture (10) of air and vapor at 95° C. containing 5019 kg of air and 5320 kg of water, and then is reinjected into the press (3).

A mixture (11) of air and vapor at 70° C. is obtained at the output of the evaporator (5), containing 5019 kg of air and 1395 kg of vapor, and is reinjected at the bottom of the drier (9).

The 4366 kg of return water (13) from the drier (9) and at a temperature of 75° C. and also the 3925 kg of condensation water (12a) at 75° C. from the evaporator (5) are moved into a self-evaporation still (14).

110 kg of water (15) at 60° C. from the still (14) are moved toward the evaporator (5) where they are totally evaporated. At the output of the evaporator (5), 3960 kg of vapor (6) at 60° C. are recovered.

The still (14) provides 221 kg of vapor at 60° C. of which 80 kg are moved toward the condenser (17) and 41 kg toward the compressor unit (20).

4101 kg of vapor (19) at 60° C. and 614 kg of de-superheated water (18) from the still (14) are moved to the compressor unit (20). The compressor unit (20) provides 4715 kg of vapor (21) at 110° C.

The system losses (22) are 349 kg of vapor.

2225 kg of dried alfalfa containing 225 kg of water and 2000 kg of dry matter are collected at the output of the drier (9).

Be it noted that all the water feeding the still (14) is recycled.

The power required to recompress the 4101 kg of vapor is 599 kwh for 10000 kg of alfalfa with 20% dry matter. The power required for the second pressing operation is 70 kwh. The total energy expenditure therefore is 669 kwh for 7775 kg of eliminated water, that is 0.086 kwh per kg of eliminated water, again 215 kcal per kg of eliminated water. This figure must be compared with 600–750 kcal per kg of eliminated water expended by a conventional drier.

EXAMPLE 6

Figure 6:
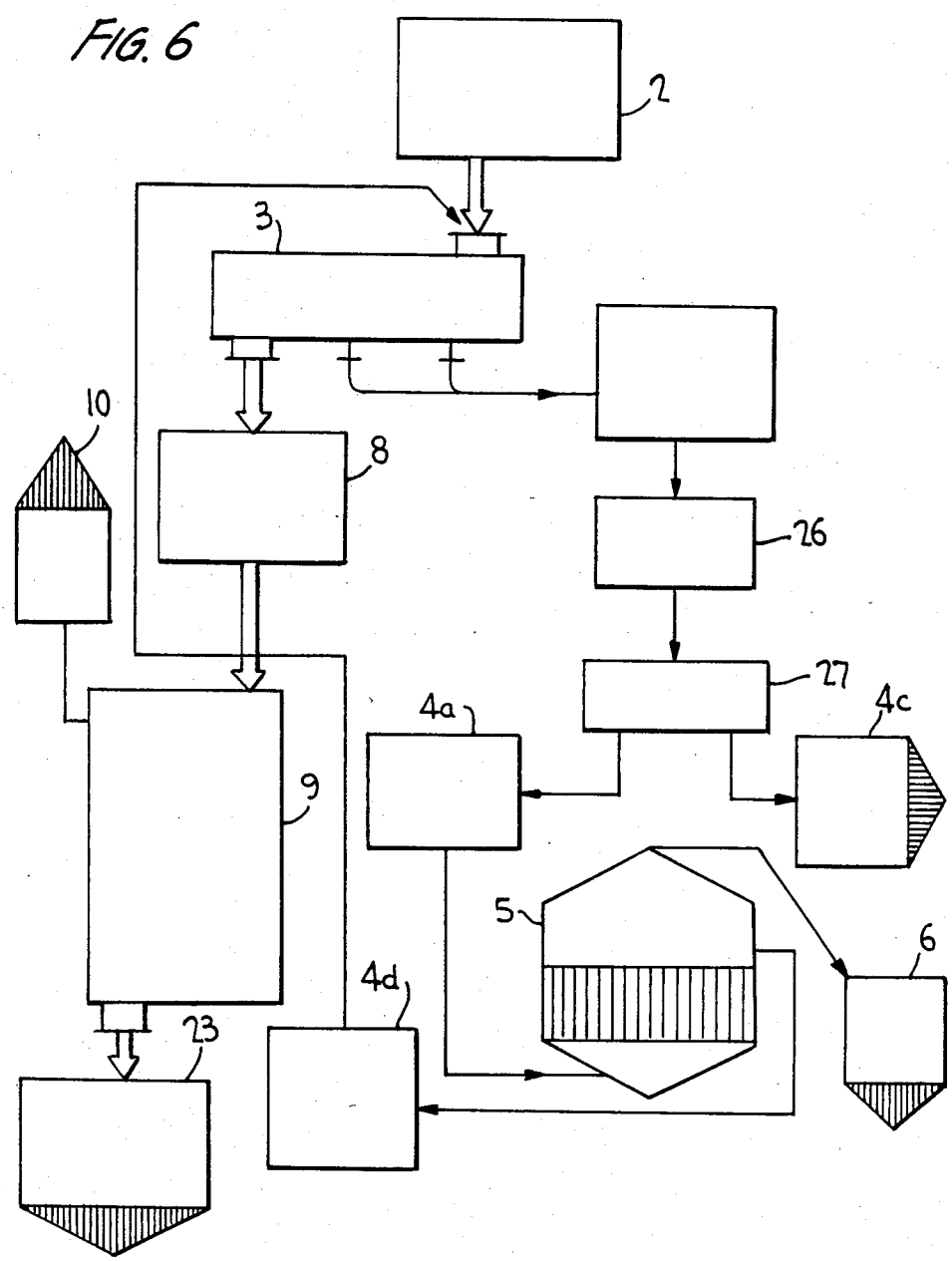
FIG. 6 is the alfalfa dehydration schematic with a serum concentration stage following protein flocculation and centrifuging.

FIG. 6: Moist alfalfa (2) with a dry-matter content of 20% is introduced in steady-state into a press (3).

The press juice (4) contains 350 kg of dry matter and 4200 kg of water, and is subjected prior to evaporation to a flocculation stage (26) followed by a centrifuging stage (27); a serum (4a) containing 190 kg of dry matter and 4040 kg of water, and a protein flocculate (4c) containing 160 kg of dry matter and 160 kg of water are recovered.

The serum (4a) is moved toward an evaporator (5) which provides 3850 kg of vapor (6). The concentrated serum (4d) containing 190 kg of dry matter and 190 kg of water is reinjected into the press (3). After pressing, the drier (9) receives the alfalfa (8) containing 1840 kg of dry matter and 3990 kg of water. 3780 kg of vapor (10) and of dried alfalfa (23) containing 1840 kg of dry matter and 210 kg of water are collected.

EXAMPLE 7

Figure 7:
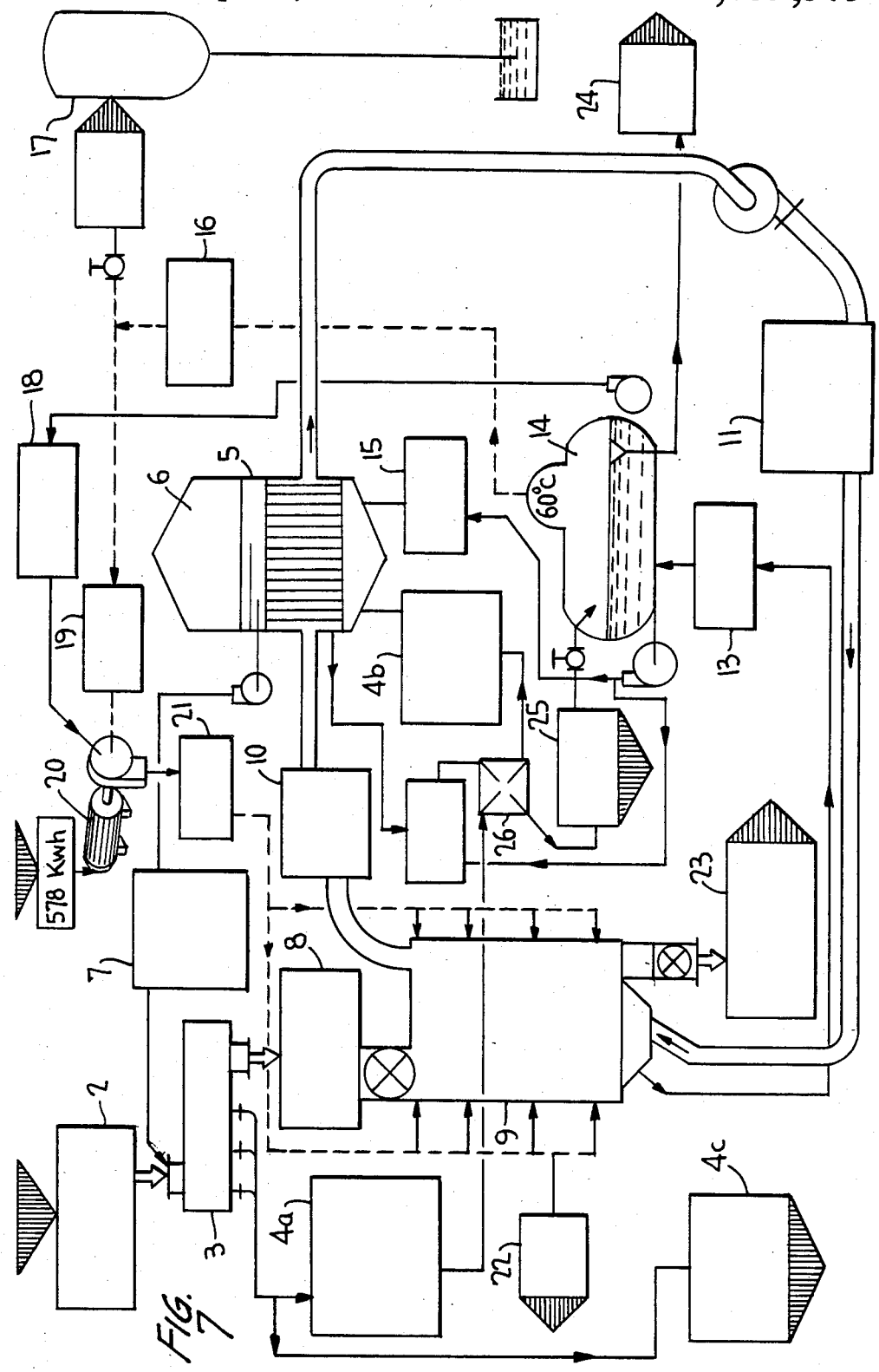
FIG. 7 is the alfalfa drying schematic wherein use is made of a drier fed by the recompressed vapor, and comprising a serum concentration stage following protein flocculation and centrifuging.

FIG. 7: As in Example 5 and in steady-state, pressed alfalfa (8) containing 1840 kg of dry matter and 3990 kg of water is introduced into the drier (9).

The press juice is separated according to the description of Example 6 into a serum (4a) containing 190 kg of dry matter and 4040 kg of water and a flocculate (4c) containing 160 kg of dry matter and 160 kg of water.

The serum (4a) initially at a temperature of 25° C. is preheated to 55° C. in an exchanger (26).

The exchanger (26) is fed with 7152 kg of water (12b) at 60° C. from the still (14). The water cooled to 43.1° C. is discharged at (25).

The preheated serum (4b) is introduced as the cold fluid into the evaporator (5) of which the tube stack is fed with the mixture (10) of air and vapor at 95° C. containing 4834 kg of air and 5124 kg of vapor, then the concentrated serum (7) containing 190 kg of dry matter and 190 kg of water is reinjected into the press (3). A mixture (11) of air and vapor is obtained at the output of the evaporator (5), containing 4834 kg of air and 1344 kg of vapor at 70° C., and is injected at the bottom of the drier (9).

The 4213 kg of return water (13) from the drier (9) at a temperature of 75° C. and also 3780 kg of condensation water (12a) at 75° C. from the evaporator (5) are moved into the self-evaporation still (14).

36 kg of water (15) at 60° C. from the still (14) and in totally evaporated form are moved toward the evaporator (5). At the output of the evaporator (5), 3886 kg of vapor (6) at 60° C. are collected.

The still (14) provides 213 kg of 60° C. vapor of which 141 kg are moved toward the condenser (17) and 72 kg are moved toward the compressor unit (20).

In this manner the compressor unit (20) receives 3958 kg of vapor (19) and 592 kg of de-superheated water (18) from the still (14). The compressor unit (20) provides 4550 kg of 110° C. vapor (21).

The system losses (22) are 337 kg of vapor.

It will be noted as well that all waters fed to the still (14) are recycled.

The power required to recompress 3958 kg of vapor is 578 kwh. The power required for the second pressing stage being 70 kwh, the total energy expenditure is 648 kwh for an amount of 7630 kg of eliminated water, namely 0.0849 kwh per kg of eliminated water or 212 kcal per kg of eliminated water.

It follows from the above that the dehydration process of moist vegetables of the invention permits achieving a very substantial increase in the dry-matter proportion and that provided the press juice of said vegetables is concentrated by an evaporator wherein it acts as the cold fluid, large savings in energy are obtained when the evaporator is integrated into a drier operating by vapor recompression.

I claim:

1. A continuous dehydration process for moist vegetables comprising (a) subjecting moist vegetables to a pressing operation; (b) concentrating the juice obtained in said pressing operation in an evaporator to a concentration of less than about 60% by weight of dry matter; (c) steeping moist vegetables prior to the pressing operation of (a) above with the concentrated juice obtained in (b) above; (d) introducing the vegetables subjected to the pressing operation into a drier; (e) feeding heater elements of the drier with vapor, said vapors being produced by the evaporation of juice in step (b) above; and (f) heating the evaporator used in (b) above with a mixture of air and vapor issuing from the drier.

2. The process according to claim 1 wherein the vegetables are subjected to more than one pressing operation and the juice from the last pressing operation is preheated by being passed through a heat-exchanger fed with the water of condensation of the evaporator before entering said evaporator.

3. The process according to claim 1 wherein the moist vegetables are beets and the process includes two consecutive pressing operations.

4. The process according to claim 1 wherein the moist vegetable is alfalfa and the process includes only a single pressing operation.

5. The process according to claim 2 wherein the juice from the last pressing operation is flocculated and centrifuged so as to obtain a serum and a flocculate mainly consisting of proteins before being concentrated in the evaporator.

6. The process according to claim 3 wherein the concentration of said juice is less than 20%.

7. The process according to claim 6 wherein the concentration of the juices is between about 4% and 15%.

8. The process according to claim 4 wherein the concentration of said juice is less than about 55% but higher than about 20%.

* * * * *